United States Patent Office 3,227,569
Patented Jan. 4, 1966

---

3,227,569
METHOD OF UPGRADING SAND
Charles E. Thompson, Jr., Martinsburg, W. Va., assignor to Products Development Company, Jefferson, W. Va., a corporation of West Virginia
No Drawing. Filed Dec. 16, 1963, Ser. No. 330,614
15 Claims. (Cl. 106—91)

This application is a continuation-in-part of Serial No. 117,774, filed June 19, 1961, now U.S. Patent No. 3,131,074 which was a continuation of Serial No. 761,920, filed September 19, 1958 (now abandoned) which in turn was a continuation of Serial No. 673,124 filed July 22, 1957 (now abandoned).

This invention relates to a method of upgrading sands or other fine aggregate materials in order to make them more usable in making Portland cement type or bituminous type concretes, or in other applications.

It is well known in the art that low-grade or dirty sand cannot be used to make good Portland cement concrete or bituminous concrete. For many years users of concrete have required suppliers of sand to meet certain specifications for sand to be used in concrete which included sizing specifications for the sand or fine aggregate to be employed. Among other criteria, these specifications place a definite maximum percentage of material passing through a 200 mesh screen (referred to as "—200 mesh material"). The American Association of State Highway Officials has set up a test for "Sieve Analysis of Fine and Coarse Aggregates" (AASHO Designation: T 27–60) which has been widely accepted as the standard sizing test. Of this test AASHO says:

"This method of test covers a procedure for the determination of the particle size distribution of fine and coarse aggregates, using sieves with square openings. The method is also applicable to the use of laboratory screens with round openings. It is not intended for use in the sieve analysis of aggregates recovered from bituminous mixtures or for the sieve analysis of mineral fillers."

Based upon the use of this test the users of sand which is to be used in Portland cement and/or the users of Portland cement have set up sizing specifications. Although there are usually both maximum and minimum limitations on the amount of each particle size material which may be present in the sand according to a typical Portland cement sand specification, such specifications usually place only an upper limit on the amount of material which can pass a No. 200 mesh sieve. The limitation on —200 mesh material, as it is called, usually is 3% or less by weight. The fraction of material passing the No. 200 mesh sieve usually comprises clay and fine silts or other deleterious matter, thus making the sand containing such material, called "dirty sand," unsatisfactory for use in Portland cement. Although the —200 mesh material can be decreased through washing operations, such washing is expensive and frequently will affect the size grading of the balance of the sand and cause it to be non-specification through removal of too much of the No. 40 mesh sieve to 200 mesh sieve material.

With respect to the fine aggregate for use in bituminous concrete, the same sizing test is applied, but the specification for —200 mesh material typically will run from 0 to 8% by weight, with a minimum of 2 or 3% by weight being sometimes imposed. Here again, the problem of too much —200 mesh material exists, although, perhaps, not as critically, and the washing solution is not altogether satisfactory.

More recently, various concrete users, especially various State Highway Departments, have been requiring the sand used in both types of concrete to have a prescribed sand equivalent value as determined by the "Sand Equivalent Test," in addition to the aforementioned sizing specification. This test is described as "Standard Method for Plastic Fines in Graded Aggregates and Soils by Use of the Sand Equivalent Test" and set forth as test AASHO Designation T 176–56 in the test manual of the American Association of State Highway Officials, 8th Edition, 1961. Of this test, AASHO says: "The test is intended to serve as a rapid field test to show the relative amounts of plastic fines in graded aggregates and soils." The use of this standard determines the presence of clay, silt and other deleterious matter by volume (rather than by weight) and the application of specifications imposing the use of this test will reject many sands which pass the screening tests. By imposing the higher standards through the use of the Sand Equivalent Test, many sands which were formerly acceptable are now deemed unacceptable for the production of bituminous or Portland cement concrete. Typically, the sand equivalent value specification for sand for use in Portland cement concrete is set at 80, while the sand equivalent value specification for sand to be used in bituminous concrete is set at 55. Many sands which pass the gradation specifications have sand equivalent values as much as 15 or 20 units below the specification requirements.

It is therefore an object of this invention to provide a novel method for upgrading sand wherein the sand equivalent value is raised.

It is also an object of this invention to provide a method for reducing, through agglomeration, the amount of material in a sand or fine aggregate passing a standard 200 mesh screen.

It is also an object of this invention to provide an additive which will upgrade sand for use in the production of air entrained Portland cement concrete.

It is a further object of this invention to provide a method for lowering the plasticity index of aggregate material.

Other objects and advantages of the present invention will be apparent from the detailed description of the invention which follows.

Generally, this invention is directed to the treatment of fine aggregate, which is commonly and hereinafter called sand. Fine aggregate, broadly, is defined as all mineral matter passing the No. 8 sieve for bituminous concrete and the ⅜" sieve for Portland cement concrete. It consists of natural sand and/or manufactured material derived by crushing stone, slag or gravel, that is, it may comprise silica, or limestone or mixtures of both. Other sources define fine aggregate as mineral matter passing a No. 10 mesh sieve but not passing a No. 270 mesh sieve. This definition is further refined by calling the No. 10 mesh sieve to No. 40 mesh sieve material "coarse sand" and the No. 40 mesh sieve to No. 270 mesh sieve material "fine sand." While some Portland cement users usually prefer a silica sand, and some bituminous or asphaltic cement users usually prefer a limestone sand, it will be understood that this invention applies equally to both type sands. In the event the user of the sand requires a mixture, both silica sand and limestone sand may be treated separately and mixed together for use, or a mixture of both types may be treated with the additive of this invention.

The foregoing and other objects are accomplished by the practice of this invention which, briefly, comprises upgrading sand to produce a sand with an increased Sand Equivalent value and a lower percentage of material which will pass a standard 200 mesh screen by admixing the sand or other fine aggregate, prior to its use, with an upgrading agent or additive. The additive of this invention comprises, based upon the dry weight of the sand treated from about 0.01% to about 0.5% by weight, preferably from about 0.06% to 0.25% by weight, of a nitrogen containing organic compound such as a water insoluble, alkali soluble protein such as casein, or a water-solubilized scleroprotein such as glue or gelatin or mixtures thereof; and from about 0.05 to about 10 percent by weight of an inorganic alkaline material, and preferably from 0.25 to 2% by weight of an alkaline material, for instance alkaline earth metal hydroxides such as hydrated lime, or alkaline earth metal oxides such as calcium oxide, Portland cement or a mixture of any of these materials, all weight percentages being based on the dry weight of the sand or other aggregate which is to be upgraded. The ratio by weight of the alkaline material to the protein should be at least 1:1 preferably at least 4:1. The moisture content of the admixture of the sand and the additive is not particularly critical, although some moisture is necessary. The stabilizing process may be carried out at any temperature, with a minimum temperature of about 40° F. being preferred.

The sand or fine aggregates upgraded with the additive of this invention have many highly practical uses. Several of these uses are described and illustrated by way of examples hereinbelow, such as upgrading sand to be used in Portland cement concrete and upgrading sand to be used as fine aggregate in producing bituminous concrete.

The proteins which may be used in the practice of this invention include the water-insoluble alkaline soluble proteins as well as the water-solubilized scleroproteins. Examples of water insoluble, alkaline soluble proteins include the glutelins such as glutenin and the prolamines (or prolamins) such as zein, gliadin, hortein, and bynin among the simple proteins and the phospho-proteins such as casein among the conjugated proteins. Gelatin and glue obtained by heating collagen in water, are the most common examples of water solubilized scleroproteins. Proteins obtained from vegetables (i.e., vegetable proteins) such a gluten (a mixture of glutenin and gliadin) from wheat, soybean protein (glycinin—obtainable commercially in either beta or delta form), etc., may be used. It is also contemplated that urea, various urea derivatives, and other organic compounds which contain a nitrogen atom and which preferably also contain a carboxylic acid moiety may be used in lieu of or in combination with the above described proteins. Casein is the preferred protein for use in this invention because of its effectiveness and low cost.

Although a combination of lime [CA(OH)$_2$] and Portland cement is the preferred alkaline material to be used in the practice of this invention, alkaline earth oxides or other alkaline earth metal hydroxides may be used such as strontium oxide, barium hydroxide, calcium oxide or barium oxide. In general, any Portland cement may be used in this invention including types 1, 2, 3, 4 and 5 in accordance with A.S.T.M. C150-47. This alkaline earth metal oxide, alkaline earth metal hydroxides or Portland cement may each be used as the sole alkaline material in the stabilizing agent or they may be used in admixture with one another. It is also contemplated that other inorganic alkaline agents such as caustic, lye, and ammonium hydroxide may be useful under some circumstances.

It is preferred, but not essential to premix the constituent ingredients of a stabilizing additive. The stabilizing additive may be stored for long periods of time in the absence of undue moisture and then transported in dried form. The stabilizing additive is prepared merely by mixing together from about 1 to 50 percent by weight of protein and from about 50 to 99 percent of the alkaline material, all weights being based upon the total weight of the stabilizing additive. Other compounds may be optionally added to the stabilizing agent. At the time of utilization of the prepared stabilizing agent, it is mixed together with the sand or other aggregate in the presence of a small amount of moisture.

Alternatively, the additive may be made up and then mixed with water or other aqueous liquid to form a slurry or a solution. The slurry or solution of the additive and water may be applied to the sand to be treated by spraying or other convenient means. This particular mode of operation is of particular value when used in conjunction with washing or grading operations. It is also contemplated by this invention that the additive may be applied to the sand in the form of a non-aqueous slurry or solution. Such non-aqueous application may be of value in producing bituminous concrete.

It is also contemplated by this invention that the additive may be mixed with the sand in the presence of any convenient amount of water, with the sand being dried or wetted to appropriate moisture levels prior to use. It is not necessary to use the treated sand immediately, since it can be stored for long periods of time, although it is desirable to use the sand within several days of its treatment for best results.

In order to successfully upgrade sand with this invention it is essential that the additive be mixed with the sand in the presence of at least some moisture. It is preferred that between 1% and 10% moisture, based upon the weight of the dry sand, be present although as little as 0.05% moisture appears to be useful under some circumstances. The upper limit of the moisture is not critical and can run to 20% by weight or higher, but such moisture levels are generally not desired by the users of the sand.

The following examples will serve to illustrate the use of the additive of this invention. These examples are merely illustrative and are not intended to be limiting.

EXAMPLES 1-5

A series of experiments was run in order to demonstrate the synergism achieved by the additive of this invention wherein the additive is used to upgrade raw fine aggregate. For all runs, the same lot of silica sand, obtained from the H. B. Mellott Estate near Warfordsburg, Pennsylvania, was used. Prior to making each run, the sample of sand was placed in a pan, which was placed in an oven held at 140° F. The sand was dried in the oven until a constant weight was achieved, which usually required about 1 hour. Water was added to the sand and mixed therewith in quantity sufficient to achieve a moisture content of 7% by weight based upon the dry sand. For all runs a sample of approximately 1000 grams was mixed with about 10 grams of the additive specified below (except Example 1 which was the untreated control) in order to obtain a sample containing 1% of additive based upon the dry weight of the sand. The additive and the sand were thoroughly mixed by hand and the mixture was allowed to age for about one half hour. The sample was then divided into two parts, one of which was used to run the Sand Equivalent Tests according to AASHO Designation T176-56, and the other of which was used to run the Sieve Analysis of Fine and Coarse Aggregates according to AASHO Designation T-27-60. The results of these tests are tabulated below:

*Table I*

| Example No. | Additive | SE Value | −200 Mesh Material |
|---|---|---|---|
| 1 | None | 70 | 1.55 |
| 2 | Casein | 72 | 1.50 |
| 3 | Lime | 72 | 1.38 |
| 4 | Portland cement | 75 | 1.49 |
| 5 | Mixture of 1 part casein, 1 part Portland cement and 4 parts lime by weight. | 84 | 0.56 |

EXAMPLES 6-15

A series of runs were made in order to ascertain the effect of varying the protein to alkaline material ratio insofar as that ratio affects the Sand Equivalent value of sand which is treated with the additive of this invention. In this series, the same sand as described for Examples 1-5 was used. The sand was dried in the manner set forth in Examples 1-5 and the moisture content was similarly adjusted to 7% by weight. In all cases 1% of the additive based upon the dry weight of the sand, using casein as the protein, was added to the sand and mixed and aged in the manner set forth in Examples 1-5. In all cases the alkaline material was made up of 1 part by weight of Portland cement and 4 parts by weight of lime. Insofar as was possible, the protein to alkaline material ratio was the only variable changed throughout this series of runs. The results of the Sand Equivalent tests are presented in Table II, the values for casein and alkaline material being in parts by weight.

*Table II*

| Example No. | Casein | Alkaline Material | SE Value |
| --- | --- | --- | --- |
| 6 | 1 | 1 | 89 |
| 7 | 1 | 2 | 87 |
| 8 | 1 | 4 | 85 |
| 9 | 1 | 5 | 84 |
| 10 | 1 | 6 | 78 |
| 11 | 1 | 8 | 76 |
| 12 | 1 | 10 | 76 |
| 13 | 1 | 14 | 73 |
| 14 | 1 | 16 | 73 |
| 15 | 1 | 20 | 72 |

It will be noted that Example 9 is the same as Example 5, above.

EXAMPLES 16–22

A series of runs were made in order to ascertain the effect of varying the alkaline material composition insofar as that composition affects the Sand Equivalent Value. In this series, the same sand as described in Examples 1-5 was used and subjected to the same drying and wetting operation described there. Samples of approximately 500 grams of sand were mixed with about 5 grams of additive in order to achieve 1% by weight of additive based upon the dry weight of the sand. The additive for these runs was made up of 1 part by weight of casein and 5 parts by weight of an alkaline material. As is shown in Table II, the Portland cement to lime ratio was varied throughout these runs. As in the preceding examples, the additive was mixed with the sand, aged, dried and divided for testing. The results are set forth in Table III, the values for the casein, Portland cement and lime being in parts by weight.

*Table III*

| Example No. | Casein | Portland Cement | Lime | SE Value |
| --- | --- | --- | --- | --- |
| 16 | 2 | 10 | 0 | 73 |
| 17 | 2 | 8 | 2 | 77 |
| 18 | 2 | 6 | 4 | 77 |
| 19 | 2 | 5 | 5 | 78 |
| 20 | 2 | 4 | 6 | 80 |
| 21 | 2 | 2 | 8 | 84 |
| 22 | 2 | 0 | 10 | 79 |

It will be noted that Example 21 is the same as Examples 5 and 9, above.

EXAMPLES 23–30

A series of runs were made in order to determine the effect of varying the amount of the additive mixed with the sand insofar as that amount affects the Sand Equivalent Value. In all runs the sand described in Examples 1-5 was subjected to the same preliminary treatment. The additive used in all cases was 1 part by weight of casein, 1 part by weight of Portland cement, and 4 parts by weight of lime. Following the procedure outlined in the foregoing examples, the additive was made up and mixed with the sand, the mixture aged and dried for testing. The results are given in Table IV below, the values for percentage of additive and percentage of casein being based upon the dry weight of the sand.

*Table IV*

| Example No. | Percent Additive | Percent Casein | SE Value |
| --- | --- | --- | --- |
| 23 | 0.06 | 0.010 | 70 |
| 24 | 0.10 | 0.0167 | 73 |
| 25 | 0.40 | 0.0667 | 77 |
| 26 | 0.80 | 0.133 | 82 |
| 27 | 1.00 | 0.167 | 84 |
| 28 | 1.50 | 0.250 | 85 |
| 29 | 2.00 | 0.333 | 85 |
| 30 | 3.00 | 0.50 | 86 |

It will be noted that Example 27 is the same as Examples 5, 9 and 21, above.

EXAMPLES 31–35

A series of runs were made in order to determine the effect of the moisture content of the sand insofar as it affects the Sand Equivalent value of sand which has been treated with the additive of this invention. In all cases the sand used was the same as described for Examples 1-5. The required amounts of moisture, as shown in Table V, were added to sand samples which had been oven dried as described in Examples 1-5. In all cases, 1% of the additive based upon the dry weight of the sand was added to the moistured sand. The additive used for all runs consisted of 1 part by weight of casein, 1 part by weight of Portland cement and 4 parts by weight of lime. Following the procedure outlined in Examples 1-5, the samples were aged, dried and divided for testing. The results are set forth in Table V, the values for the moisture percentage being based upon the dry weight of the sand.

*Table V*

| Example No. | Percent moisture | SE value |
| --- | --- | --- |
| 31 | 0 | 70 |
| 32 | 2.5 | 82 |
| 33 | 5.0 | 83 |
| 34 | 7.0 | 84 |
| 35 | 10.0 | 82 |

Example 34 is the same as Examples 5, 9, 21 and 29, above.

EXAMPLES 36–42

A series of runs were made in order to show the use of some of the proteins contemplated by this invention, as used in the additive of this invention. In all cases, the sand used for Examples 1-5 was subjected to the foredescribed drying and wetting procedure. For each run, an additive was made up of 1 part by weight of a protein (as listed in Table VI), 1 part by weight of Portland cement, and 4 parts by weight of lime. In all cases 1 percent by weight, based upon the dry weight of the sand, of the additive was mixed with the sand and aged, dried, and divided according to the procedure described in Examples 1-5. The results are set forth in Table VI.

*Table VI*

| Example No. | Nitrogen containing organic compound source | SE value |
| --- | --- | --- |
| 36 | Soya flour, 200 mesh | 79 |
| 37 | Delta 100 [1] | 77 |
| 38 | Wheat gluten | 78 |
| 39 | Zein | 77 |
| 40 | Cotton seed meal | 72 |
| 41 | Egg albumin | 78 |
| 42 | Urea | 72 |

[1] This is a 100 mesh extracted soya protein, delta form, sold by the Glidden Co.

EXAMPLES 43–45

In order to demonstrate the application of the additive of this invention to sand to be treated in the form of a slurry, three runs were made. In all three runs, the same sand as described in Examples 1–5 was used and it was dried in the manner therein described. In all cases, the additive used consisted of 1 part by weight of casein, 1 part by weight of Portland cement, and 1 part by weight of lime. In each case a slurry was made up by mixing the amount of additive sufficient to make up the percentage of additive used (as shown in Table VII) with the amount of water sufficient to make the sand moisture content 7% based upon the dry weight of the sand. In other words, the additive to water ratio varied between the runs as did the additive to sand ratio, although the water to sand ratio was held constant at 7% moisture based upon the dry sand weight. The thus prepared slurry was sprayed over the oven dried sand and mixed therewith. The mixture was permitted to age, and was dried as described in Examples 1–5. The results are set forth in Table VII below, the "Additive to Water Ratio" and the percentage of additive in sand being by weight.

*Table VII*

| Example No. | Additive to water ratio | Percent additive in sand | SE value |
|---|---|---|---|
| 43 | 1:35 | 0.2 | 74 |
| 44 | 1:14 | 0.5 | 81 |
| 45 | 1:7 | 1.0 | 84 |

EXAMPLE 46

In order to show the use of an alkaline material other than lime, one run was made to show the use of an ammonia solution in place of lime. Sand, as described the foregoing examples, was dried for testing. To the sand was added 7% by weight of an aqueous solution of 5% by weight ammonia. To this mixture ⅙% casein and ⅙% Portland cement were added and the total mixture was mixed by hand and allowed to age for about one-half hour. The mixture was divided for testing and the test showed a Sand Equivalent value of 80.

EXAMPLES 47–50

A series of experiments were run to show the use of the additive of this invention to upgrade limestone sand. For all of these runs a limestone sand obtained from a limestone quarry operation at Inwood, West Virginia, was used. The quarry operation was run to manufacture aggregates for use in bituminous concrete. The fine aggregate fraction contained a sizable fraction of dust of fracture along with some clay, silt, and other deleterious matter. This fine aggregate was tested by the Sieve Analysis of Fine and Coarse Aggregates (AASHO Designation T 27–60), and showed the following gradation:

33.3% held on No. 8 screen
16.7% held on No. 16 screen
25% held on No. 50 screen
16.7% held on No. 200 screen
8.3% passed No. 200 screen This gradation is generally unsatisfactory for use in bituminous concrete according to most present day specifications, since the —200 mesh material is a little on the high side. However, the Sand Equivalent value was below the 55 which is normally required for limestone sand which is to be used in the manufacture of bituminous concrete. The limstone sand was oven dried and water was added, as described in Examples 1–5 in order to bring the misture to 7% based upon the dry weight of the sand. The sand was then mixed by hand with 1% of the additive (based upon the dry weight of the sand) described in Table VIII (except run 47, which was the control run). The mixture was allowed to age for about one-half hour and was then dried and divided for testing. The results are set forth in Table VIII.

*Table VIII*

| Example No. | Additive | SE value | −200 mesh, percent |
|---|---|---|---|
| 47 | None | 40 | 8.3 |
| 48 | Casein | 42 | |
| 9 | Lime | 51 | |
| 50 | Portland Cement | 42 | |
| 51 | Mixture of 1 part by weight of casein, 1 part by weight of Portland cement and 4 parts by weight of lime. | 60 | 7.5 |

Since the SE value of Example 51 is 20 units higher than Example 47, but the minus 200 mesh material dropped less than 1%, it is believed that substantially all of the clay and silt were bound by the addition of the additive, and that the remaining 7.5% of minus 200 mesh material comprises essentially pure limestone dust.

EXAMPLES 52–59

A series of experiments were made in order to ascertain the effect of varying the protein to alkaline material ratio wherein the additive of this invention is used to treat limestone sand. The same sand as described in Examples 47–51 was used, and dried and wetted in the same manner described therein. In all cases, the alkaline material consisted of one part by weight of Portland cement and four parts by weight of lime. The alkaline material, in varying amounts as described in Table IX, was mixed with one part of casein, and one percent of this mixture was mixed with the sand, based upon the weight of dry sand. The thus treated sand was aged, dried and divided for testing as described in Examples 47–51. The results are given in Table IX, the casein and the alkaline material being in parts by weight.

*Table IX*

| Example No. | Casein | Alkaline Material | SE Value |
|---|---|---|---|
| 52 | 1 | 1 | 79 |
| 53 | 1 | 2 | 69 |
| 54 | 1 | 4 | 61 |
| 55 | 1 | 5 | 60 |
| 56 | 1 | 6 | 60 |
| 57 | 1 | 8 | 58 |
| 58 | 1 | 10 | 58 |
| 59 | 1 | 14 | 52 |

Example 54 was the same as Example 51, above.

EXAMPLES 60–66

A series of experiments were run in order to determine the effect of changing the alkaline material composition wherein the additive of this invention is used to upgrade limestone sand. The same sand was used and was dried and wetted as described in Examples 47–51. For all runs 1 percent of additive based upon the dry weight of the sand was used. The additive for each run consisted of 2 parts by weight of casein and 10 parts by weight of alkaline material, the alkaline material composition being given in Table X. The additive and sand were mixed by hand as described in Examples 47–51, aged, dried and divided for testing. The results are given in Table X, the casein, Portland cement and lime being in parts by weight.

*Table X*

| Example No. | Casein | Portland Cement | Lime | SE Value |
|---|---|---|---|---|
| 60 | 2 | 10 | 0 | 61 |
| 61 | 2 | 8 | 2 | 62 |
| 62 | 2 | 6 | 4 | 60 |
| 63 | 2 | 5 | 5 | 60 |
| 64 | 2 | 4 | 6 | 59 |
| 65 | 2 | 2 | 8 | 60 |
| 66 | 2 | 0 | 10 | 59 |

Example 65 was the same as Examples 51 and 54, above.

EXAMPLES 67–74

A series of experiments were run in order to ascertain the effect of varying the amount of additive used to treat limestone sand. In all cases the same sand as described in Examples 47–51 was used, and was subjected to the same drying and wetting procedure. In all cases the additive used consisted of 1 part by weight of casein, 1 part by weight of Portland cement and 4 parts by weight of lime. The additive, in amounts given in Table XI, was mixed with the sand, aged, dried and divided for testing in the manner described in Examples 47–51. The results are given in Table XI, the percentage of additive and the percentage of casein being based upon the weight of the dry sand.

*Table XI*

| Example No. | Percent Additive | Percent Protein | SE Value | −200 Mesh, Percent |
|---|---|---|---|---|
| 67 | 0.06 | 0.010 | 40 | |
| 68 | 0.10 | 0.0167 | 43 | |
| 69 | 0.40 | 0.0667 | 58 | |
| 70 | 0.80 | 0.133 | 58 | |
| 71 | 1.00 | 0.167 | 60 | |
| 72 | 1.50 | 0.250 | 66 | |
| 73 | 2.00 | 0.333 | 68 | |
| 74 | 3.00 | 0.500 | 82 | 6.9 |

EXAMPLES 75–79

A series of experiments were run to determine the effect of varying the moisture content of limestone sand wherein that sand is treated with the additive of this invention. Using the limestone sand described in Examples 47–51, the sand was oven dried to constant weight and then mixed with water to bring the moisture content of the values shown in Table XII (with the exception of Example 75 to which no water was added). The sand was then mixed with 1% (based upon the dry weight of the sand) of the additive consisting of one part by weight of casein, one part by weight of Portland cement and four parts by weight of lime. The mixture was aged, dried and divided for testing as described in Examples 47–51. The results are set forth in Table XII, the percentage moisture being based upon the dry weight of the sand.

*Table XII*

| Example No. | Percent Moisture | SE Value |
|---|---|---|
| 75 | 0 | 40 |
| 76 | 2.5 | 59 |
| 77 | 5.0 | 59 |
| 78 | 7.0 | 60 |
| 79 | 10.0 | 60 |

Example 78 is the same as Examples 51, 54, 65 and 71, above.

EXAMPLE 80

In order to show the utility of applying the additive of this invention in the form of a slurry to limestone sand, a sample of limestone sand was dried as described in Examples 47–51. A slurry was formed of 7 parts by weight of water and 1 part by weight of the additive, which consisted of 1 part by weight of casein, 1 part by weight of Portland cement and 4 parts by weight of lime. Eight parts by weight of the slurry were mixed with 100 parts by weight of the dried limestone sand in order to achieve a mixture of 1% additive and 7% moisture, both based upon the dry weight of the sand. The thus treated sand was aged, dried and divided for testing, and the tests showed a Sand Equivalent Value of 61.

EXAMPLES 81–86

A series of experiments were run to illustrate the use of upgraded sand in the manufacture of Portland cement concrete. All of the runs employed the sand described in Examples 1–5. In the case of Examples 81–83, the sand was used without additive, while Examples 84–86 one percent of additive consisting of one part casein by weight, one part Portland cement by weight and four parts lime by weight was applied to the sand (having about 7% by weight moisture) and mixed therewith. The basic design mix for the concrete for Examples 81, 82, 84 and 85 was as follows:

| | |
|---|---|
| Cement | pounds__ 517 |
| Sand | do____ 1136 |
| Gravel | do____ 2107 |
| Water | gallons__ 33.5 |
| Pozzolith [1] | pounds__ 0.2 |

[1] Pozzolith is tradename of Martin Marietta for concrete additive used to provide maximum water reduction, controls rate of hardening and increases durability.

For examples 83 and 86, the basic design mix was:

| | |
|---|---|
| Cement | 517 pounds — contains 0.59 oz. of Darex per 94 lbs. of cement. |
| Sand | 1015 pounds. |
| Gravel | 2107 pounds. |
| Water | 30.0 gallons. |
| Pozzolith [1] | 0.2 pounds. |

[1] See footnote 1 above.

Both of these mixes were designed to give a compressive strength of 3450 p.s.i. with a slump of 3 inches. Examples 81 and 84 used one brand of Portland cement, while the balance of the examples used a second brand of Portland cement, while Examples 83 and 86 used commercial "Air Entrained" cement which may explain the differences in results, which are set forth in Table XIII.

*Table XIII*

| Example No. | Additive | Air Entrained Cement | Air | Slump | Cylinder Compressive Strength (p.s.i.) | | |
|---|---|---|---|---|---|---|---|
| | | | | | 7 day | 14 day | 28 day |
| 81 | No | No | 1.2 | 3.1 | 3,605 | 3,968 | 4,191 |
| 82 | No | No | 1.4 | 3.5 | 2,927 | 3,419 | 3,714 |
| 83 | No | Yes | 3.5 | 2.5 | 3,413 | 3,687 | 4,195 |
| 84 | Yes | No | 4.5 | 3.0 | 3,578 | 4,054 | 4,097 |
| 85 | Yes | No | 4.4 | 2.3 | 3,178 | 3,930 | 4,154 |
| 86 | Yes | Yes | 4.7 | 2.8 | 3,296 | 3,847 | 4,135 |

As will be seen from Examples 81 through 86, the air entrainment effect provided by the use of the additive of this invention is equivalent to the air entrainment provided by the use of commercial air entrained cement, and thus makes the use of such cement unnecessary when Portland cement concrete is to be made with sand which has been treated with the additive of this invention.

It will be obvious to those skilled in the art that the optimum additive in terms of protein, protein to alkaline material ratio, alkaline composition, water and quantity used will vary depending upon the type of sand to be upgraded as well as the type of clays, silts or other deleterious matter present therein. In other words, the best additive for use in uprgrading one sand may not be the best additive for upgrading a different sand.

It will be obvious to those skilled in the art that many modifications may be made to the foregoing detailed description without departing from the scope and spirit of the appended claims.

I claim:

1. A method of upgrading sand which comprises admixing with sand, in the presence of moisture, from about 0.01% to about 0.25% by weight of a protein selected from the group consisting of glutelins, prolamines, casein, gelatin, glue, gluten, soybean protein, and mixtures thereof, based upon the dry weight of the sand; and from about 0.05 to about 10% by weight of an alkaline material selected from the group consisting of an alkaline earth metal hydroxide, an alkaline earth metal oxide, Portland cement, and mixtures thereof, based upon the dry weight of the sand; the weight ratio of the alkaline material to the protein being at least 1:1.

2. The product of the process of claim 1.

3. The method of claim 1 wherein the protein is casein.

4. The method of claim 1 wherein the alkaline material is a mixture of lime and Portland cement.

5. The product of the process of claim 4.

6. The method of claim 4 wherein the protein is casein.

7. The method of claim 4 wherein the ratio of protein to alkaline material is about 1:5 by weight.

8. The method of claim 4 wherein the ratio of lime to Portland cement is about 4:1 by weight.

9. The method of claim 8 wherein the ratio of protein to alkaline material is about 1:5 by weight.

10. The method of claim 8 wherein the protein is casein.

11. The method of claim 10 wherein the ratio of protein to alkaline material is about 1:5 by weight.

12. A method of upgrading sand which comprises admixing with sand, in the presence of moisture, from 0.06 to 0.25% by weight of a protein selected from the group consisting of glutelins, prolamines, casein, gelatin, glue, gluten, soybean protein, and mixtures thereof, based upon the dry weight of the sand; and from 0.25 to 2% by weight of an alkaline material selected from the group consisting of an alkaline earth metal hydroxide, an alkaline earth metal oxide, Portland cement, and mixtures thereof, based upon the dry weight of the sand; the weight ratio of the alkaline material to the protein being at least 1:1.

13. The product of the process of claim 12.

14. The method of claim 12 wherein the ratio of protein to alkaline material is about 1:5 by weight.

15. The method of claim 12 wherein the protein is casein.

References Cited by the Examiner

UNITED STATES PATENTS

| | | | |
|---|---|---|---|
| 1,158,025 | 5/1939 | Hulst et al. | 106–287 |
| 2,228,019 | 1/1941 | Scripture | 106—91 |
| 2,290,956 | 7/1942 | Gruenwald et al. | 106—91 |
| 3,131,074 | 4/1964 | Thompson | 106—71 |

FOREIGN PATENTS

| | | |
|---|---|---|
| 698,792 | 10/1953 | Great Britain. |

TOBIAS E. LEVOW, *Primary Examiner.*